(12) United States Patent
Chang

(10) Patent No.: US 11,925,990 B2
(45) Date of Patent: Mar. 12, 2024

(54) INDEXABLE CENTER DRILL STRUCTURE

(71) Applicant: Hsin-Tien Chang, Taichung (TW)

(72) Inventor: Hsin-Tien Chang, Taichung (TW)

( * ) Notice: Subject to any disclaimer, the term of this patent is extended or adjusted under 35 U.S.C. 154(b) by 0 days.

(21) Appl. No.: 17/574,948

(22) Filed: Jan. 13, 2022

(65) Prior Publication Data
US 2023/0219146 A1    Jul. 13, 2023

(51) Int. Cl.
*B23B 51/00*     (2006.01)

(52) U.S. Cl.
CPC .................. *B23B 51/0063* (2013.01)

(58) Field of Classification Search
CPC ........ B23B 51/0063; B23B 2200/3618; B23B 2205/10; B23B 2205/04; B23B 2251/50
See application file for complete search history.

(56) References Cited

U.S. PATENT DOCUMENTS

| 8,192,114 | B2 | 6/2012 | Chang |
| 2010/0202844 | A1 | 8/2010 | Chang |

FOREIGN PATENT DOCUMENTS

| CN | 201394663 | Y | 2/2010 | | |
| DE | 4127509 | A1 | 4/1992 | | |
| DE | 202009005609 | U1 | 7/2009 | | |
| FR | 1038475 | A | * 9/1953 | ......... | B23B 51/0063 |
| GB | 190902433 | A | * 7/1909 | ......... | B23B 2205/10 |
| JP | H08294814 | A | 11/1996 | | |
| JP | 2010158765 | A | 7/2010 | | |
| JP | 4979093 | B2 | 7/2012 | | |
| KR | 20070078787 | A | 8/2007 | | |
| TW | M361393 | U1 | 7/2009 | | |
| WO | 2016093275 | A1 | 6/2016 | | |

* cited by examiner

*Primary Examiner* — Alan Snyder
(74) *Attorney, Agent, or Firm* — Rosenberg, Klein & Lee

(57) ABSTRACT

An indexable center drill structure comprises a holder, an insert, and at least two screws. The screws are locked to at least two screw holes of the holder and at least two positioning holes of the insert. Through cooperation of two positioning posts and two positioning notches of the holder and the insert, the insert is fixed and locked to an insert attachment seat of the holder in a longitudinal direction and in a transverse direction. Thus, the locking strength between the insert and the holder is increased, and the overall structure is simplified.

3 Claims, 11 Drawing Sheets

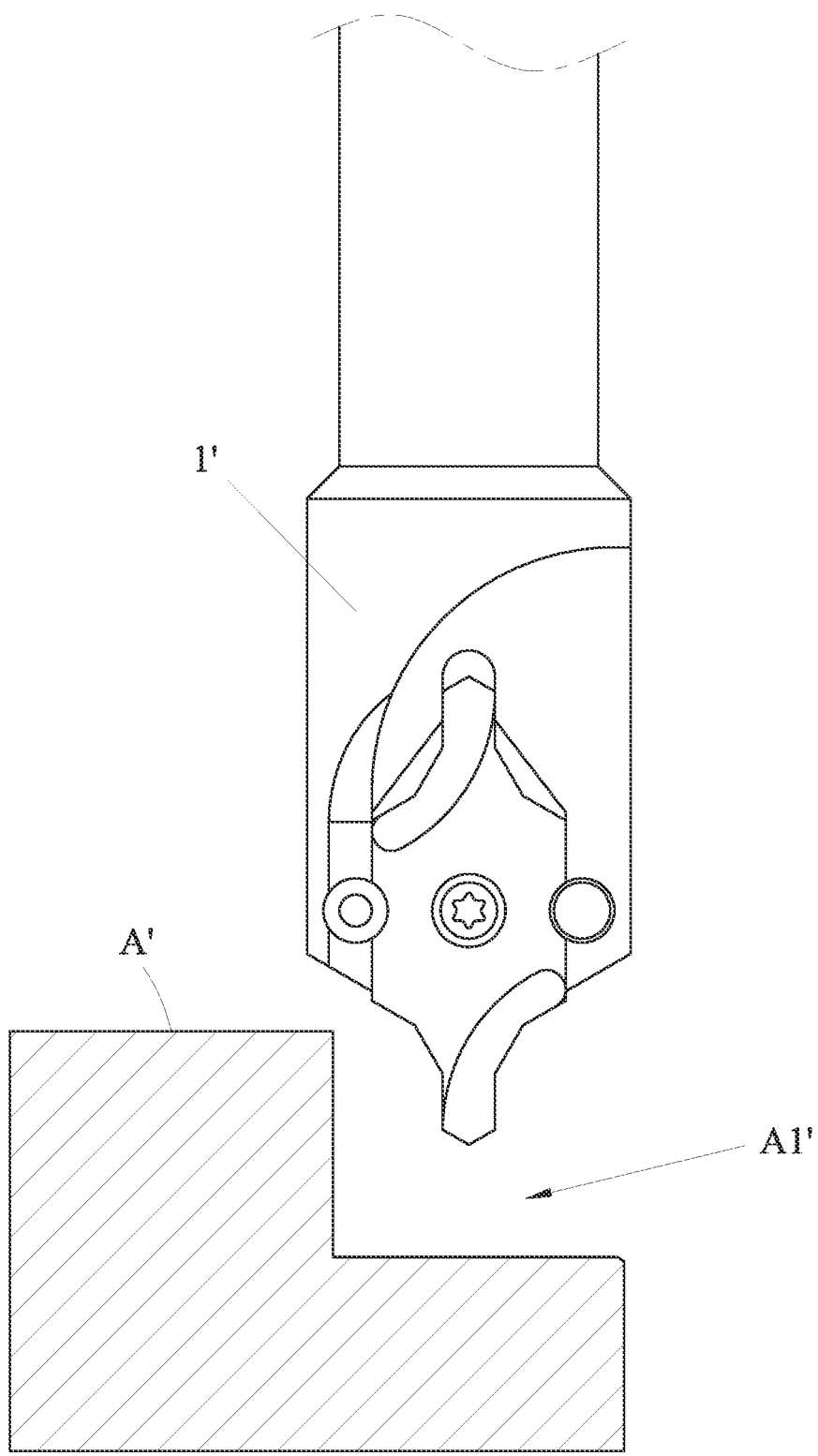
PRIOR ART   FIG. 9

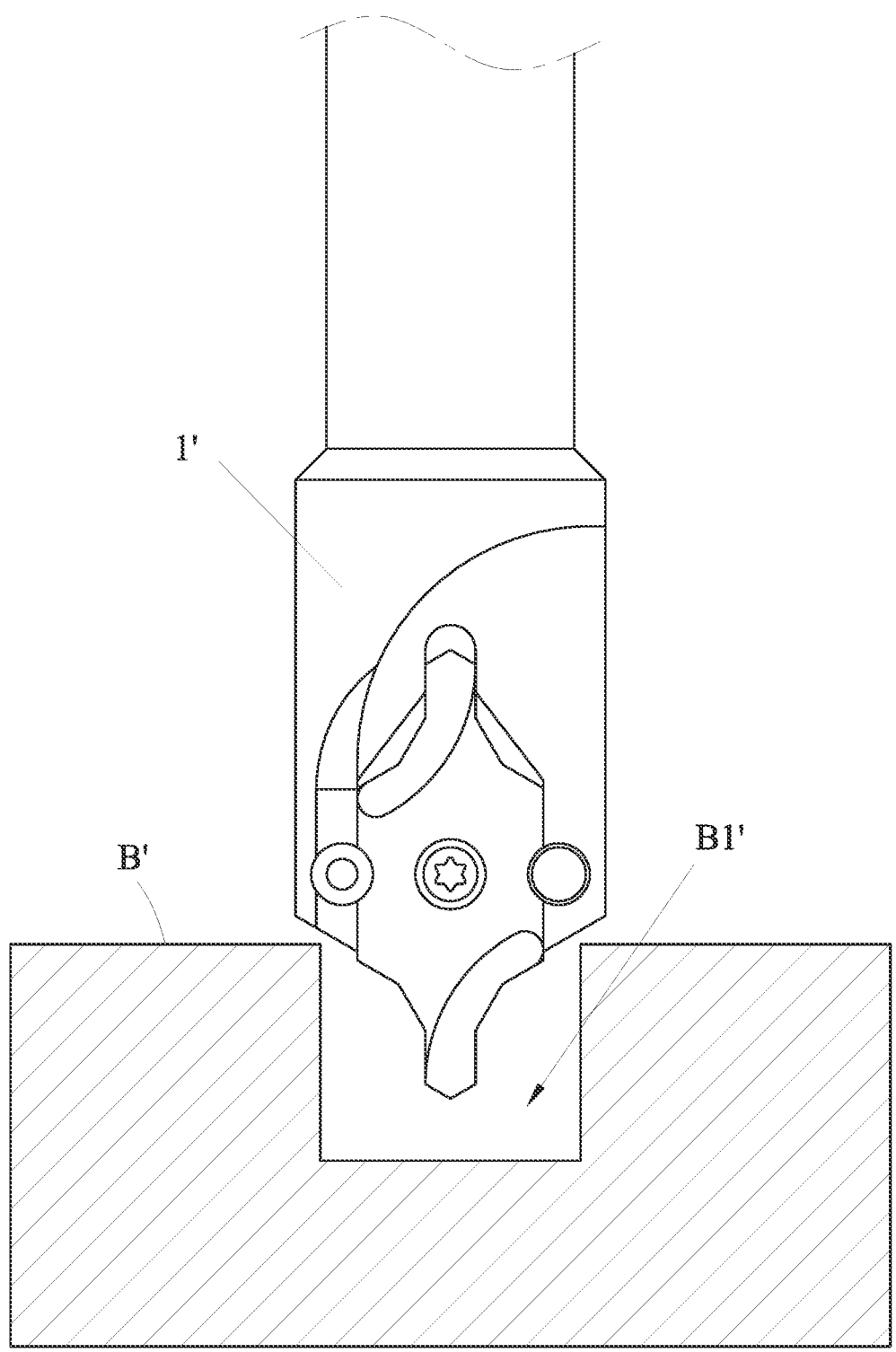
PRIOR ART  FIG. 10

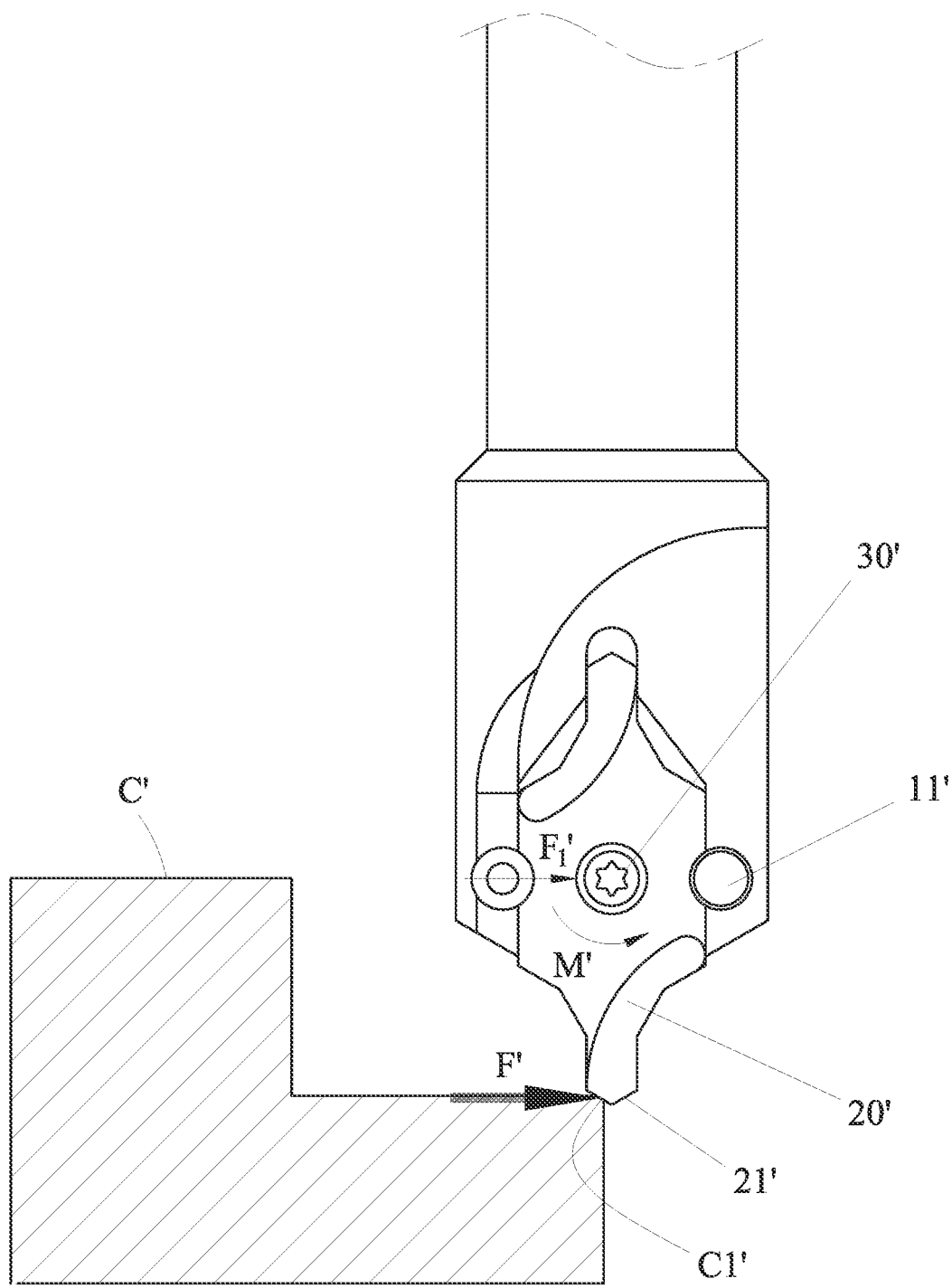
PRIOR ART FIG. 11

INDEXABLE CENTER DRILL STRUCTURE

FIELD OF THE INVENTION

The present invention relates to an indexable center drill structure, and more particularly to an indexable center drill structure having a stable locking configuration. When an insert of the center drill structure bears a lateral resistance, it won't deflect and oscillate due to the torque.

BACKGROUND OF THE INVENTION

A conventional center drill generally includes a cylindrical shank. Two drill bits are connected both ends of the shank. Most of the center drills are made of High Speed Steel (HSS). However, the cutting speed the material of high-speed steel is limited.

In order to improve the machining efficiency and quality and reduce the machining time, the inventor developed a center drill made of tungsten carbide, as disclosed in Taiwan Utility Model Publication No. M361393. Its machining rate is 5 to 20 times that of high-speed steel.

Please refer to FIGS. 9 to 11. The center drill of the aforementioned patent has plural progressive and innovative structural designs, which is deeply recognized by the tool market and loved by users, but there are still some defects in use. The diameter of the holder 1' is too large, so that the insert 20' is restricted during drilling. For example, when the insert 20' of the center drill is to drill the center hole of a workpiece A' having a step A' (as shown in FIG. 9) or a workpiece B' having a narrow groove B1 (as shown in FIG. 10), it is difficult to drill the workpiece because the diameter of the holder 1' is too large.

In addition, the insert 20' of the center drill of the aforementioned patent is locked by a single screw 30'. When the insert 20' is used for cutting a side chamfer Cl' of a workpiece C' as shown in FIG. 11, two cutting edges 21' of the insert 20' will bear an alternative main lateral thrust force F'. The main lateral thrust force F' generates a lateral thrust force F1' and a torque M' on the screw 30' even if the insert 20' is restricted by a positioning rod 11'. However, there is still a slight tolerance between the insert 20' and the positioning rod Even if the tolerance value is controlled below 0.05 mm, the insert may wobble slightly. In a chamfering process, the insert 20' may oscillate in a small frequency range. The higher the speed, the higher the frequency of oscillation. As a result, the surface roughness value and dimensional accuracy of the workpiece C' are reduced.

SUMMARY OF THE INVENTION

In view of the above-mentioned shortcomings, the primary object of the present invention is to provide an indexable center drill structure.

An indexable center drill structure provided by the present invention comprises a holder, an insert, and at least two screws. The holder has an insert attachment seat. The insert attachment seat has at least two screw holes arranged along a longitudinal direction. Inner edges of two sides of the insert attachment seat have one of a pair of positioning posts and a pair of positioning notches arranged along a transverse direction. An angle is defined between the longitudinal direction and the transverse direction. The insert is accommodated in the insert attachment seat. The insert has at least two positioning holes corresponding to the screw holes. Outer edges of two sides of the insert have the other one of the pair of positioning posts and the pair of positioning notches arranged along the transverse direction. The screws are coupled to the holder and the insert. When the insert is accommodated in the insert attachment seat, the screws are locked in the screw holes and the positioning holes, and the positioning posts are engaged in the positioning notches, so that the insert is fixed and locked to the insert attachment seat in the longitudinal direction and in the transverse direction, and a distal end of the insert extends out of the insert attachment seat.

Preferably, the inner edges of the two sides of the insert attachment seat have a pair of first straight sides adjacent to the pair of positioning posts, the outer edges of the two sides of the insert have a pair of second straight sides adjacent to the pair of positioning notches. When the insert is accommodated in the insert attachment seat, the pair of second straight sides are attached to the pair of first straight sides.

Preferably, the pair first straight sides are located between the pair of positioning posts and a shank of the holder. The outer edges of the two sides of the insert have two upper and lower pairs of second straight sides. The upper pair of second straight sides are located at one end of the pair of positioning notches close to the shank. The lower pair of second straight sides are located at another end of the pair of positioning notches away from the shank. When the insert is accommodated in the insert attachment seat, the upper pair of second straight sides are attached to the pair of first straight sides, and the lower pair of second straight sides extend out of the insert attachment seat.

According to the above technical features, the present invention can achieve the following effects.

1. The two screws can strengthen the locking strength between the insert and the holder, which can resist the torque caused by the cutting force, avoid the oscillation caused by a single screw, and improve the machining efficiency.

2. Due to the increased locking strength, only the first straight sides on the upper portions of both sides of the insert attachment seat are required. The structure of the holder is simplified, and the structure of the insert below the second straight sides is not surrounded by the insert attachment seat. The diameter can be reduced by at least 40%. When the insert of the center drill is to drill the center hole of a workpiece having a step or narrow groove, the insert won't be impeded, thereby improving the machining efficiency.

BRIEF DESCRIPTION OF THE DRAWINGS

FIG. 9 is a schematic view of a conventional center drill used to drill a step of a workpiece;

FIG. 10 is a schematic view of the conventional center drill used to drill a narrow groove of a workpiece; and FIG. 11 is a schematic view of a conventional center drill used to cut a chamfer of a workpiece.

DESCRIPTION OF THE PREFERRED EMBODIMENTS

Embodiments of the present invention will now be described, by way of example only, with reference to the accompanying drawings.

Figure 1:
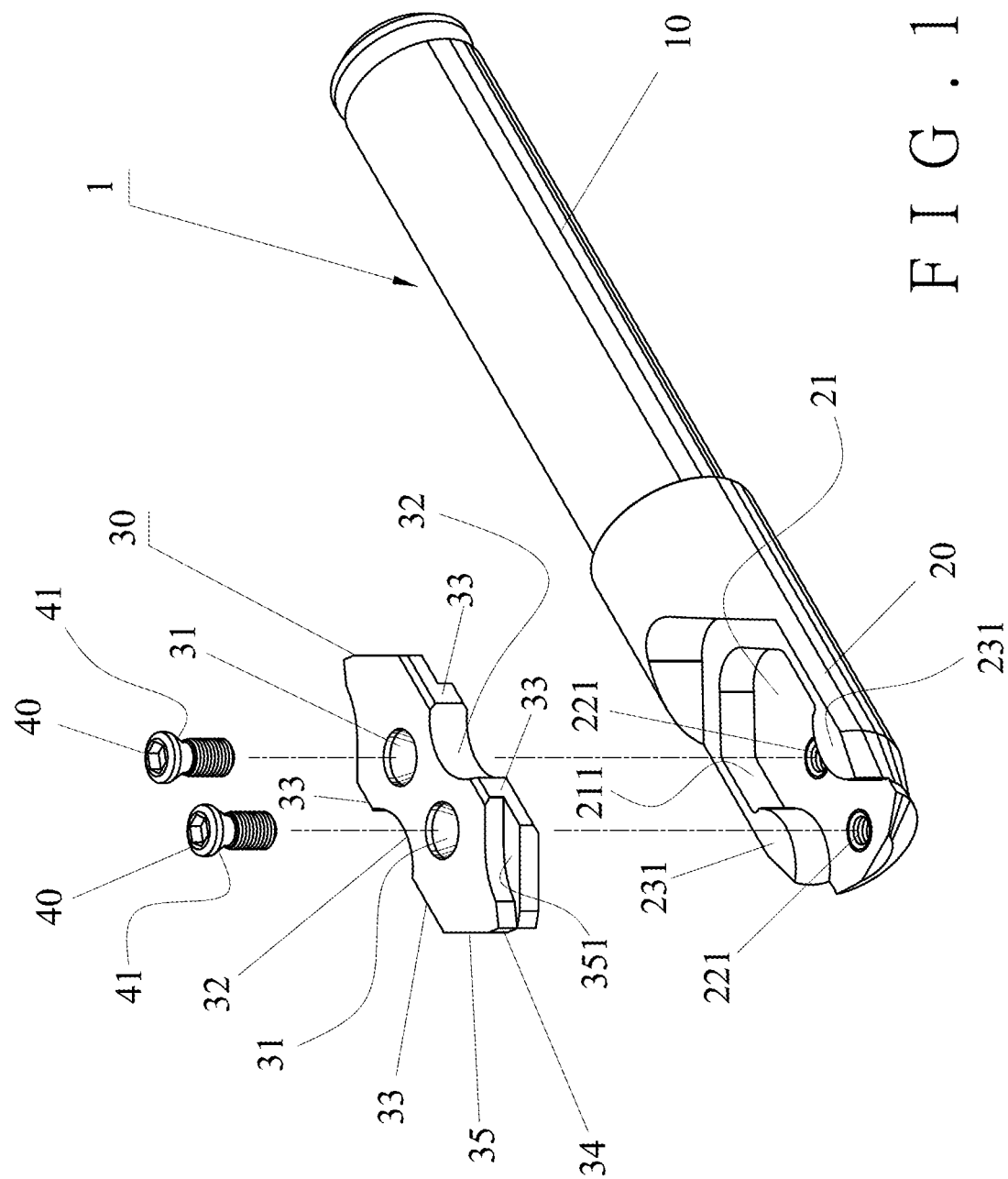
FIG. 1 is an exploded view of an embodiment of the present invention.
Figure 2:
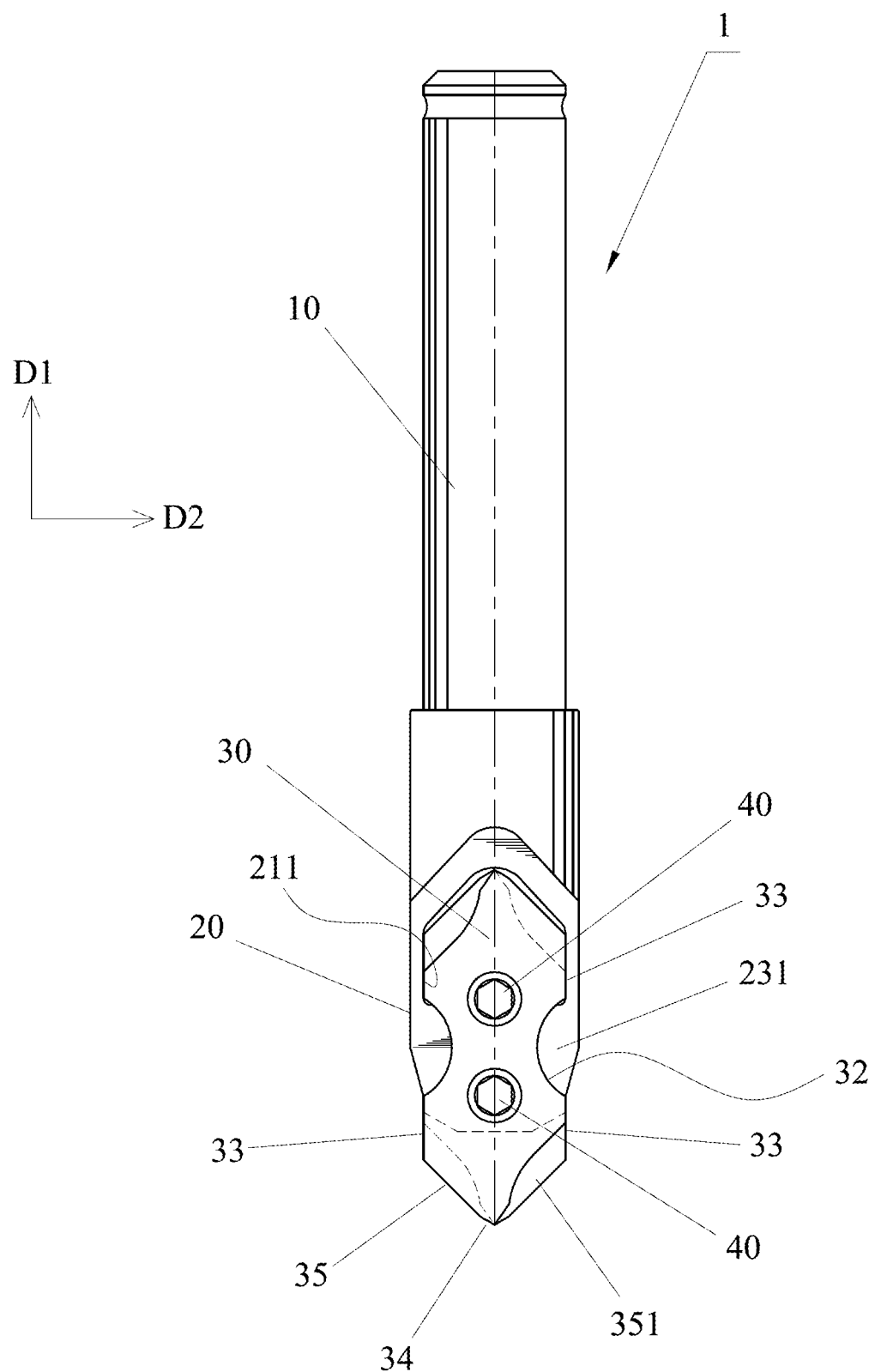
FIG. 2 is a top view of the embodiment of the present invention.

As shown in FIG. 1 and FIG. 2, an indexable center drill structure according to an embodiment of the present invention comprises a holder 1 and an insert 30.

The holder 1 includes a shank 10 and an insert holding portion 20 connected to the shank 10. The shank 10 is clamped by the chuck of a drilling machine (not shown). The length and the shape of the shank 10 may be different according to the types of the chucks of the drilling machine. The insert holding portion 20 includes an insert attachment seat 21. The insert attachment seat 21 has a pair of first straight sides 211 on the inner edges of two sides of the insert attachment seat 21. The insert attachment seat 21 further has at least two screw holes 221 arranged along a longitudinal direction D1. The inner edges of the two sides of the insert attachment seat 21 have a pair of positioning posts 231 arranged along a transverse direction D1 and connected to the pair of first straight sides 211. The pair first straight sides 211 are located between the pair of positioning posts 231 and the shank 10. The pair of positioning posts 231 are located at the end of the insert attachment seat 21. The insert attachment seat 21 is configured to accommodate the insert 30. An angle is defined between the longitudinal direction D1 and the transverse direction D2. In this embodiment, the angle is 90 degrees.

The insert 30 has a flat shape. At least two positioning holes 31 are defined in a central portion of the insert 30. The insert 30 has a pair of positioning notches 32 arranged along the transverse direction D1 on the outer edges of two sides of the insert 30. The positioning posts 231 and the positioning notches 32 are in an arc shape, respectively. The two sides of the insert 30 have two pairs of second straight sides 33 connected to the upper and lower ends of the pair of positioning notches 32. The insert 30 further has a tip 34 at the distal end of the insert 30, a pair of cutting edges 35 between the tip 34 and the lower pair of second straight sides 33, and a pair of chip flutes 351. The insert 30 is locked to the insert attachment seat 21 by at least two screws 40.

Figure 3:
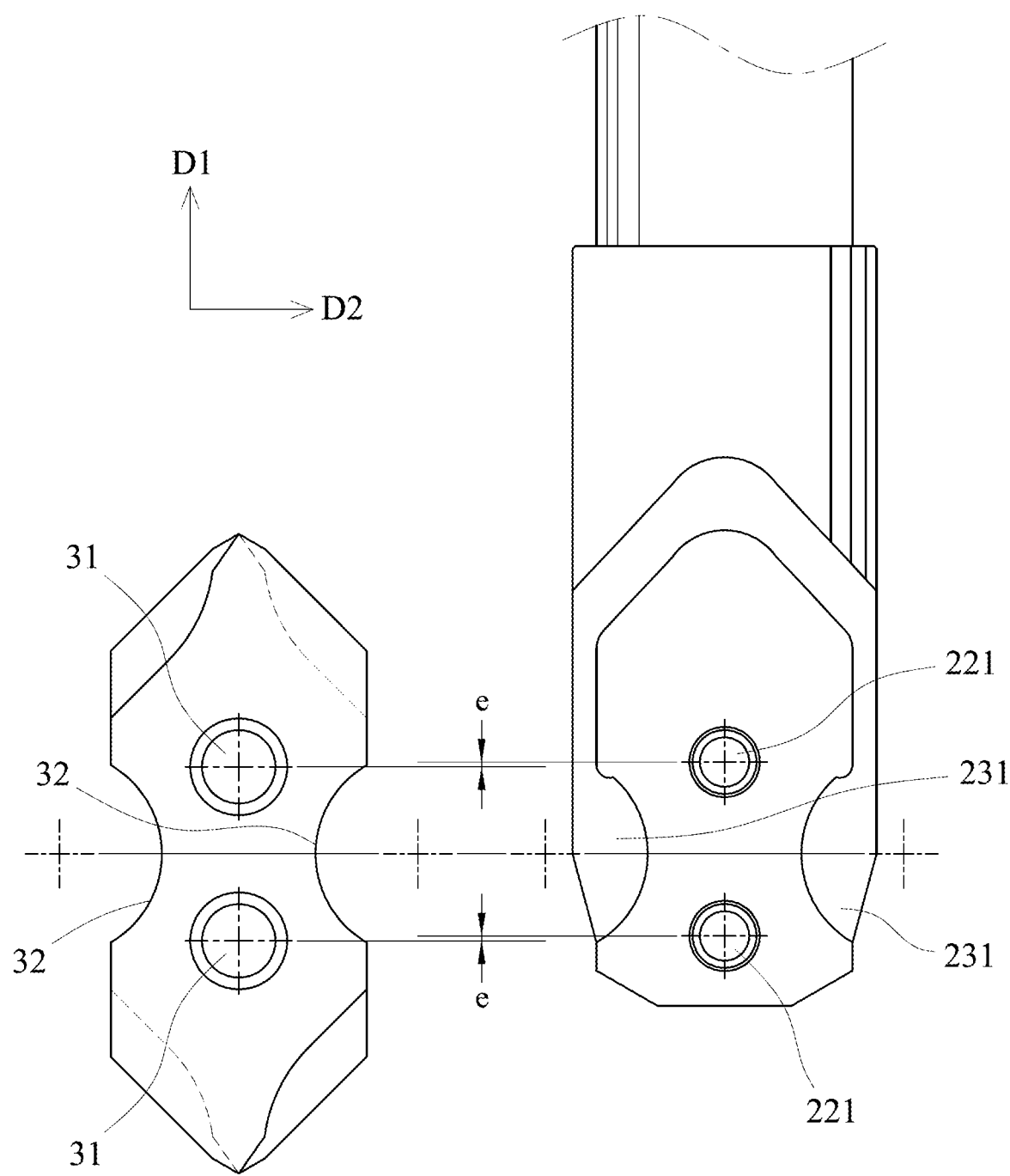
FIG. 3 is a partial exploded view of the embodiment of the present invention.
Figure 4:
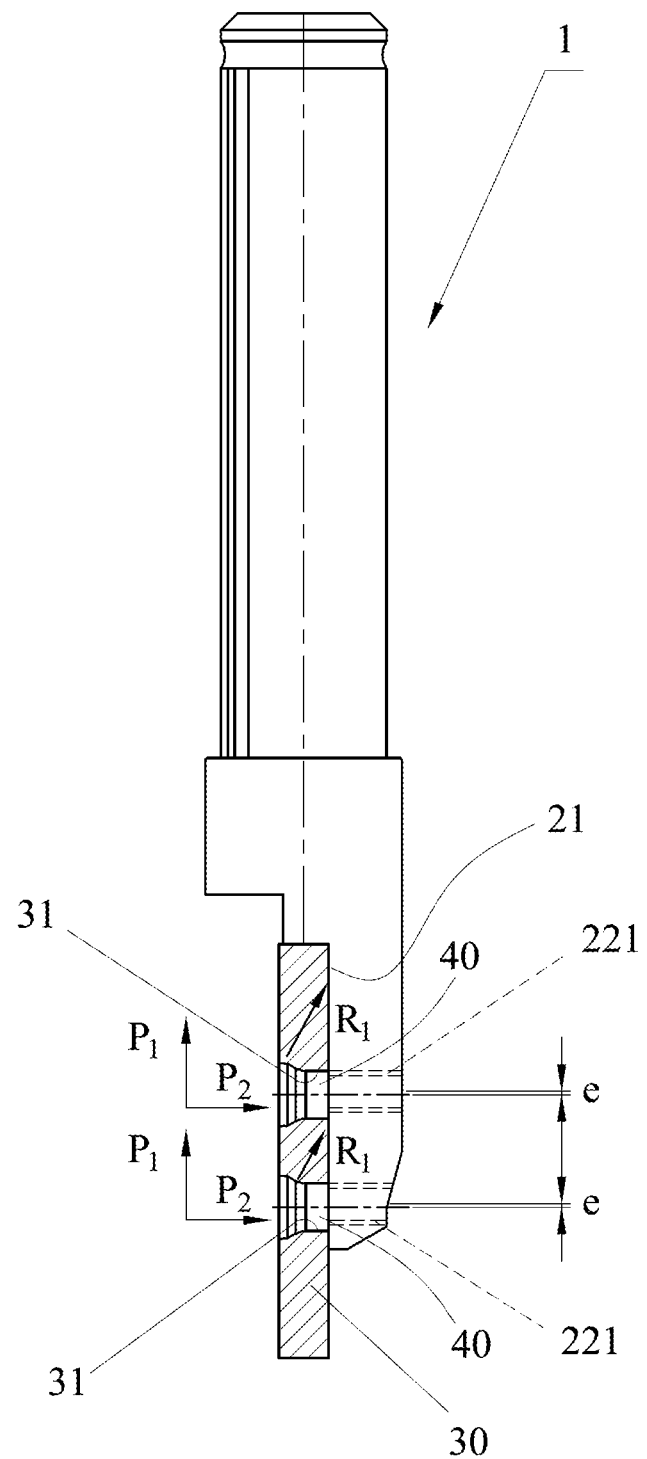
FIG. 4 is a side cross-sectional view of the embodiment of the present invention.

Please refer to FIGS. 2-4. In this embodiment, the insert attachment seat 21 has the two screw holes 221, the insert 30 has the two positioning holes 31, and the two screws 40 are provided. An offset distance "e" is defined between the respective axes of the positioning hole 31 and the corresponding screw hole 221 of the insert attachment seat 21. The offset distance is between 0.01 mm and 0.5 mm, for example, 0.15 mm.

When the insert 30 is fitted to the holder 1, the positioning notches 32 on both sides of the insert 30 are engaged with the positioning posts 231 of the holder 1, and the insert 30 is locked to the holder 1 by the two screws 40 screwed to the screw holes 221 and the positioning holes 31. The pair of first straight sides 211 are attached to the upper pair of second straight sides 33 close to the shank 10. The distal end of the insert 30, including the part below the lower pair of second straight sides 33 away from the shank 10, extends out of the insert attachment seat 21. The part of the insert 30, accommodated in the insert attachment seat 21, corresponds in shape to the insert attachment seat 21.

Due to the offset distance "e" defined between the respective axes of the positioning hole 31 and the corresponding screw hole 221 of the insert attachment seat 21, when the two screws 40 are to be locked downward, the head 41 of each screw 40 (as shown in FIG. 1) will generate thrust forces P1 and P2 to push the corresponding positioning hole 31 upward and move toward the screw hole 221 (as shown in FIG. 4), and a resultant force R1 is generated for the positioning notches 32 on both sides of the insert 30 to be attached to the positioning posts 231 tightly.

Figure 5:
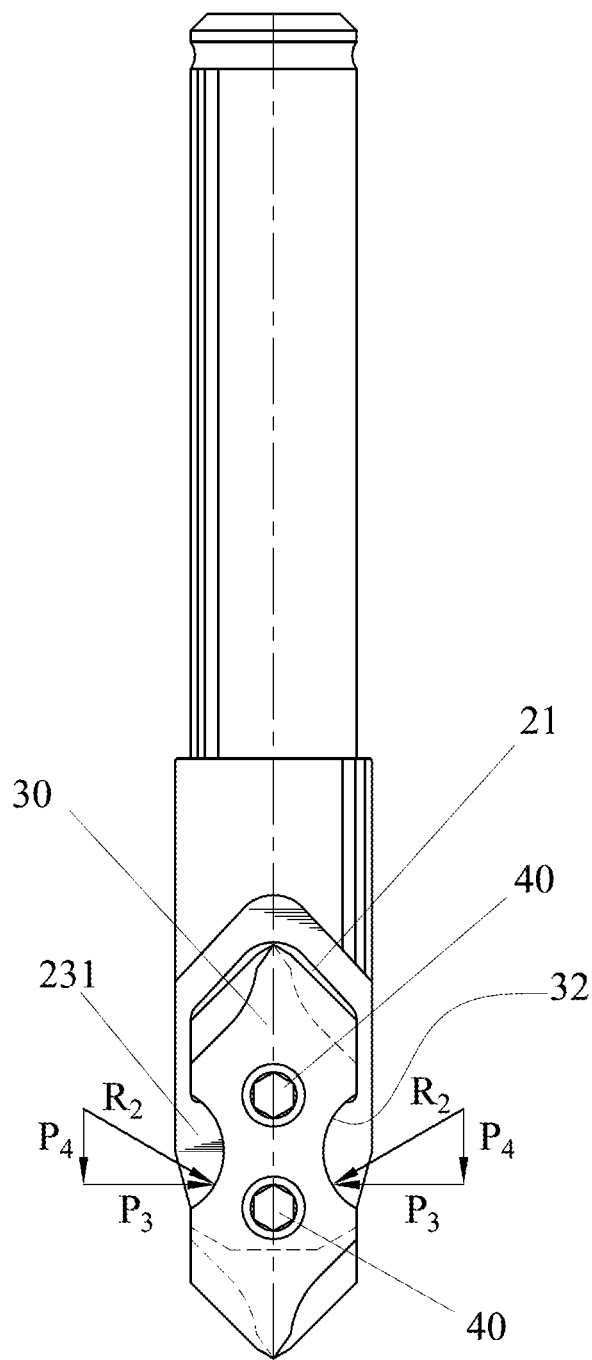
FIG. 5 is a schematic view of the embodiment of the present invention, illustrating that the insert is locked to the insert attachment seat to generate a thrust force.

Please refer to FIG. 2, FIG. 4 and FIG. 5. When the screw 40 is to lock the insert 30, in addition to the resultant force R1, the positioning notch 32 of the insert 30 and the corresponding positioning post 231 of the insert attachment seat 21 will generate a tightening thrust force P3. The gravity of the insert 30 will form a downward thrust force P4 to generate a resultant force R2 for positioning the insert 30 to the center of the insert attachment seat 21. Thus, the insert 30 is locked to the insert attachment seat 21 by the screws 40, and the degrees of freedom in the longitudinal direction D1 and in the transverse direction D2 are restricted.

Figure 6:
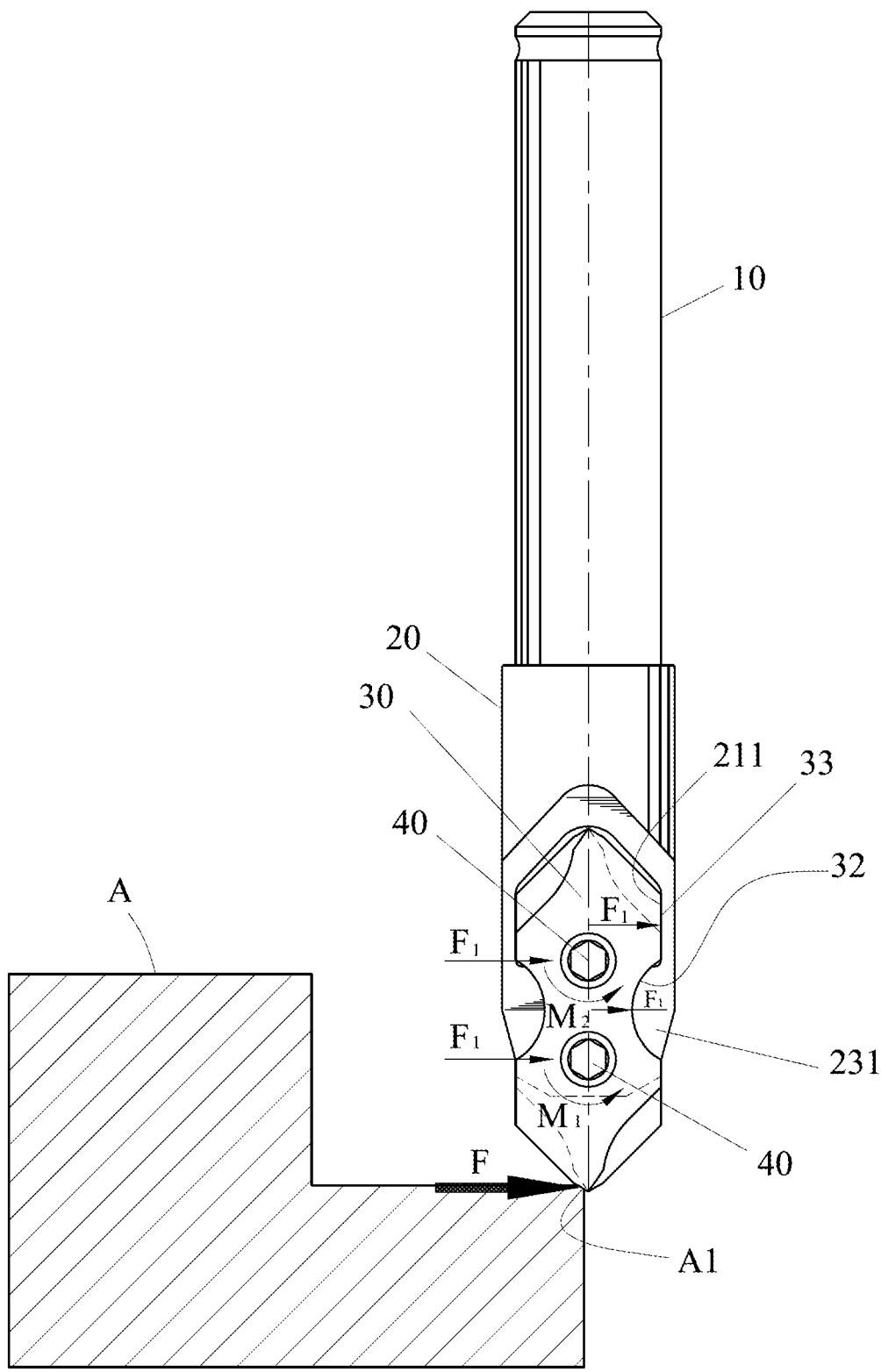
FIG. 6 is a schematic view of the embodiment of the present invention used to cut a chamfer of a workpiece.

Please refer to FIG. 1 and FIG. 6. The arrangement of the two screws 40 and the first straight sides 211 on both sides of the insert attachment seat 21 can resist a torque M1, M2 and a lateral thrust force F1 caused by the cutting force, thereby preventing oscillation caused by a single screw 40.

In more detail, when performing a cutting operation (especially for cutting a chamfer A1 of a workpiece A), the two cutting edges 35 alternately bear a main lateral thrust force F. The two screws 40, the first straight sides 211 of the insert attachment seat 21 and the positioning posts 231 respectively bear the lateral thrust force F1 averagely and the torque M1, M2 generated by the main lateral thrust force F against the screws 40. The two screws 40 counterbalance each other to prevent the insert 30 from shaking. Through the engagement of the positioning notches 32 on both sides of the insert 30 and the positioning posts 231 of the holder 1, the insert 30 is locked by the two screws 40 more tightly.

Figure 7:
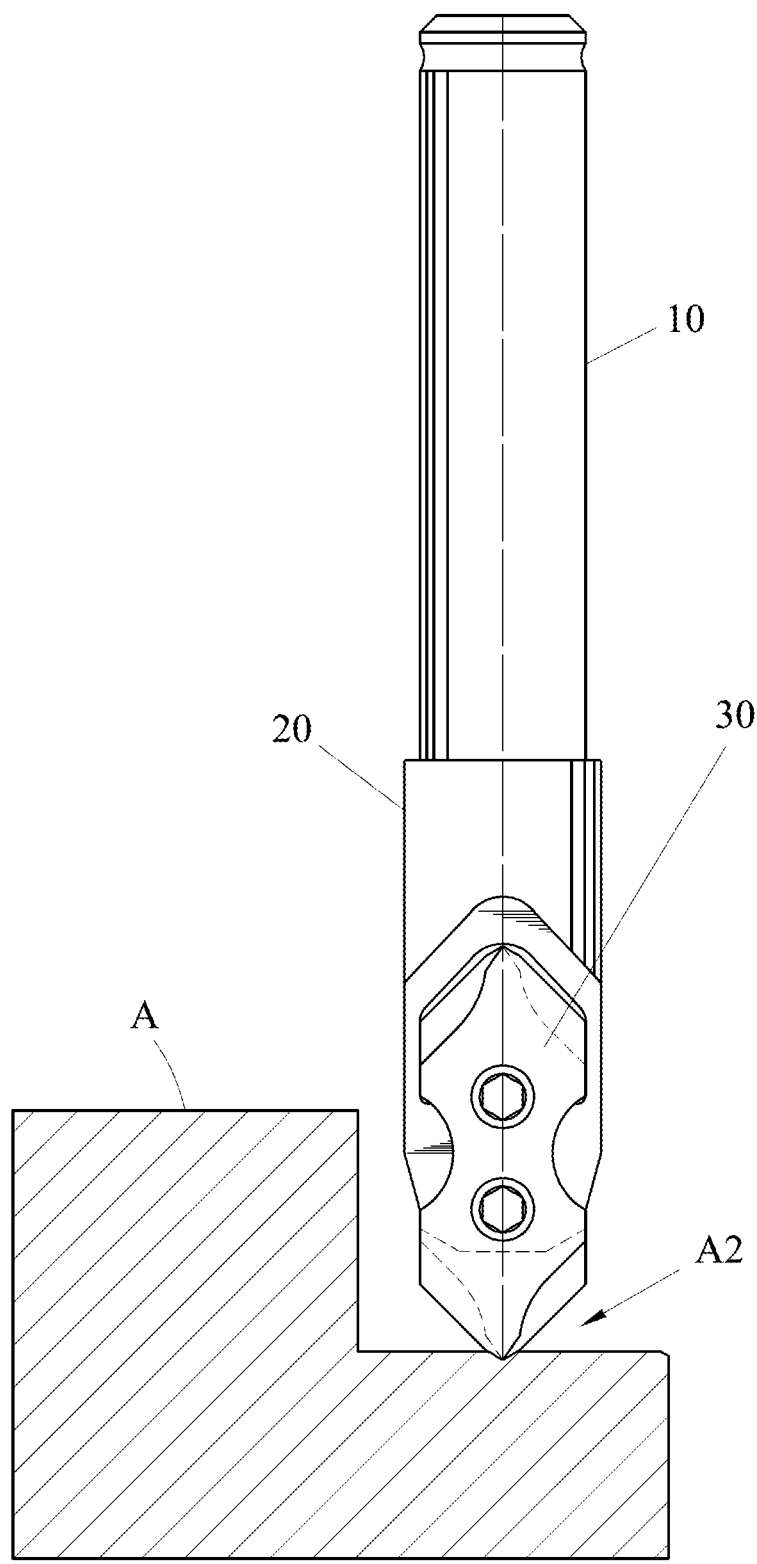
FIG. 7 is a schematic view of the embodiment of the present invention used to drill a step of a workpiece.
Figure 8:
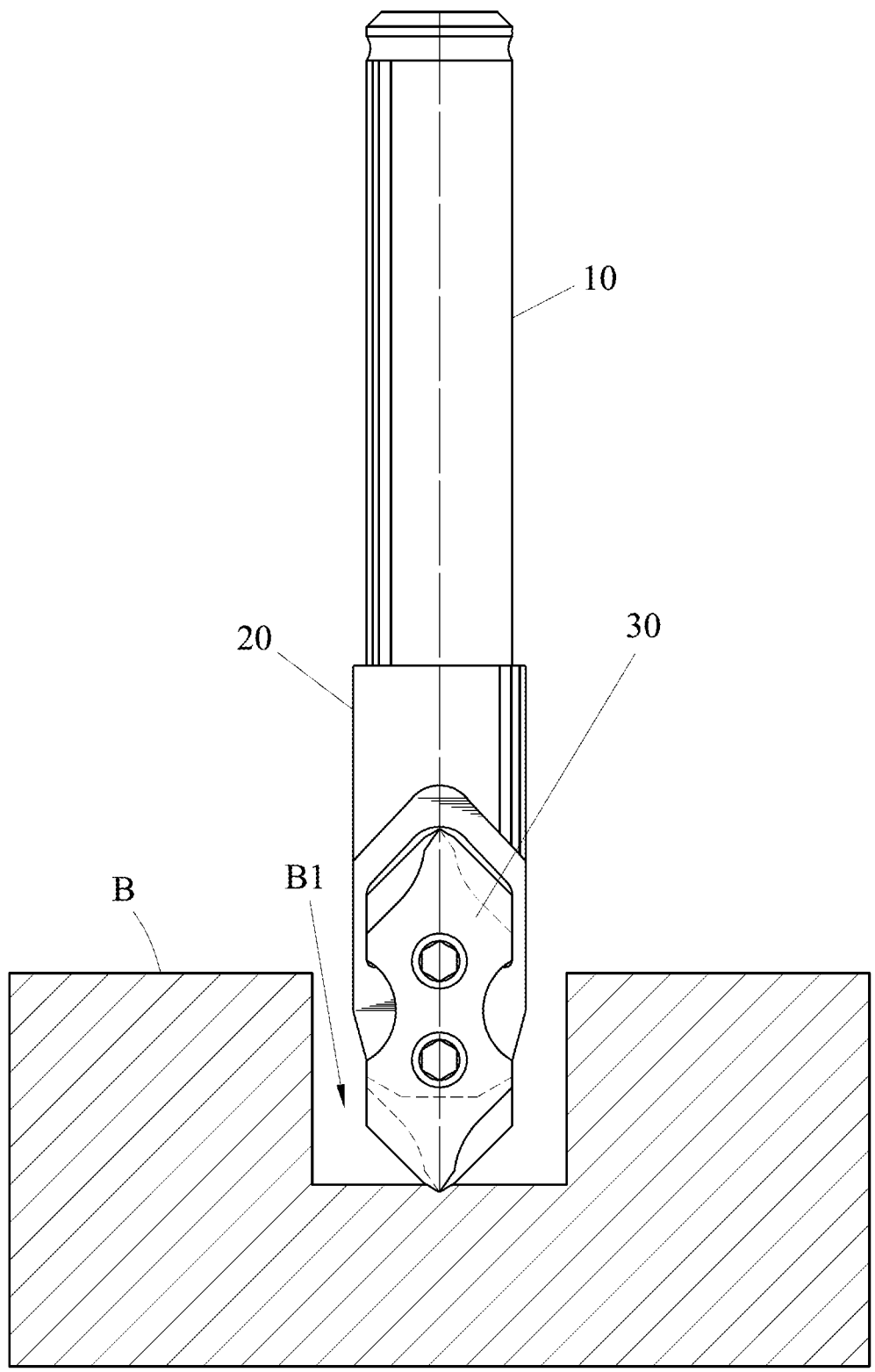
FIG. 8 is a schematic view of the embodiment of the present invention used to drill a narrow groove of a workpiece.

Please refer to FIG. 1, FIG. 7 and FIG. 8. Compared with the structure of a center drill cutter as disclosed in Taiwan Utility Model Publication No. M361393, the present invention simplifies the structure of the straight sides on the lower parts of both sides of the insert attachment seat 21. The structure of the holder 1 is simplified, and the insert attachment seat 21 only has the first straight sides 33 on the upper parts of both sides of the insert attachment seat 21, such that the structure of the insert 30 below the second straight sides 33 is not surrounded by the insert attachment seat 21, and the diameter can be reduced by at least 40%. In this way, when the insert 30 is to drill a step A2 of a workpiece A as shown in FIG. 7 or a narrow groove B1 of a workpiece B as shown in FIG. 8, the insert 30 won't be impeded. Therefore, the sizes of the shank 10, the insert holding portion 20 and the insert 30 may be changed according to the shape and size of the workpiece A, B. According to the actual trial and test results, the diameter of the insert holding portion 20 may be changed from 9.5, 12, 14.5, 19 to 24 mm according to different needs, and the change value is not limited to between 9.5 and 24 mm.

Please refer to FIG. 1 and FIG. 2. The positioning posts 231 are connected to the first straight sides 211 on both sides of the insert attachment seat 21, and correspond in shape to the positioning notches 32 on both sides of the insert 30, and have precise matching tolerances. The insert 30 can be positioned very accurately and quickly. There is no need to position or calibrate the length and position of the tip 34. It is very convenient for use. Saving the time of calibration is to reduce the time of machining operations and increase the production efficiency. The insert 30 can be positioned quickly through the positioning posts 231 of the insert attachment seat 21. The first straight sides 211 on both sides of the insert attachment seat 21 also provide a positioning function. The first straight sides 211 on both sides of the insert attachment seat 21 and the second straight sides 33 connected to the upper and lower ends of the positioning notches 32 on both sides of the insert 30 are correspondingly designed, and they also have precise matching tolerances. The insert 30 is accommodated in the insert attachment seat 21 to achieve the positioning effect and to have the function of bearing the cutting stress.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An indexable center drill structure, comprising:
a holder, having an insert holding portion with an insert attachment seat, the insert attachment seat having at least two screw holes arranged in spaced relationship in a longitudinal direction, said insert attachment seat defining a pair of inner edges of two opposing sides and respective arcuately contoured end sections each being spaced each from the other in a direction transverse with respect to the longitudinal direction on opposing sides of the insert attachment seat, each of the pair of arcuately contoured end sections forming a segment of a circle having a center point external to an external surface of said insert holding portion, each of said arcuately contoured end sections being disposed at a distal end of a respective inner edge of a corresponding side of the insert attachment seat and in correspondence with a position intermediate the screw holes;
an insert, accommodated in the insert attachment seat, the insert having at least two positioning holes corresponding to the screw holes of the insert attachment seat, outer edges of two sides of the insert respectively have a pair of positioning notches arranged along the transverse direction in correspondence with the arcuately contoured end sections of the insert attachment seat; and
at least two screws, coupled to the holder and the insert;
wherein when the insert is accommodated in the insert attachment seat, the screws are threaded in the screw holes and the positioning holes, and the arcuately contoured end sections are engaged in the positioning notches, so that the insert is fixed and threadedly secured to the insert attachment seat in the longitudinal direction and in the transverse direction, and a distal end of the insert extends out of the insert attachment seat.

2. The indexable center drill structure as claimed in claim 1, wherein the inner edges of the two sides of the insert attachment seat have a pair of first straight sides adjacent to the pair of arcuately contoured end sections, the outer edges of the two sides of the insert have a pair of second straight sides adjacent to the pair of positioning notches whereby the insert is accommodated in the insert attachment seat, and the pair of second straight sides are attached to the pair of first straight sides.

3. The indexable center drill structure as claimed in claim 2, wherein the pair first straight sides are located between the pair of arcuately contoured end sections and a shank of the holder, the outer edges of the two sides of the insert have two upper and lower pairs of second straight sides, the upper pair of second straight sides are located at one end of the pair of positioning notches close to the shank, the lower pair of second straight sides are located at another end of the pair of positioning notches away from the shank; when the insert is accommodated in the insert attachment seat, the upper pair of second straight sides are attached to the pair of first straight sides, and the lower pair of second straight sides extend out of the insert attachment seat.

\* \* \* \* \*